(No Model.)
J. P. & W. D. FLEMING.
BAND CUTTER AND FEEDER FOR THRASHING MACHINES.
No. 343,021. Patented June 1, 1886.
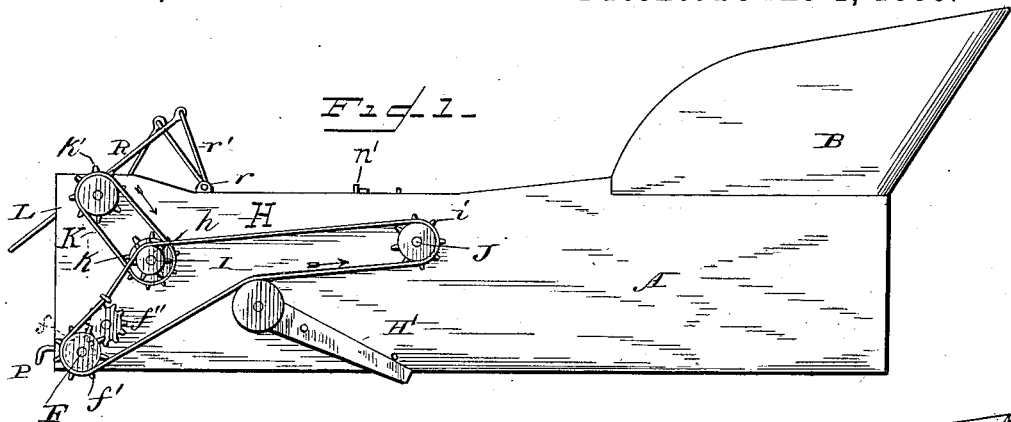
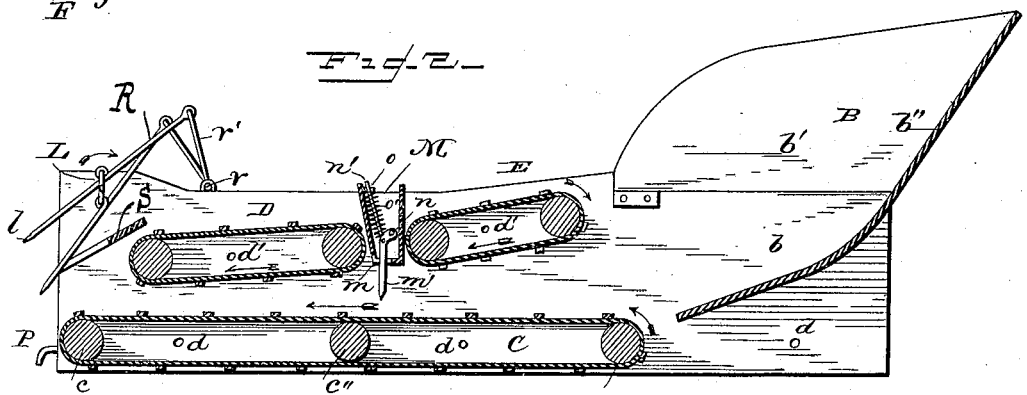
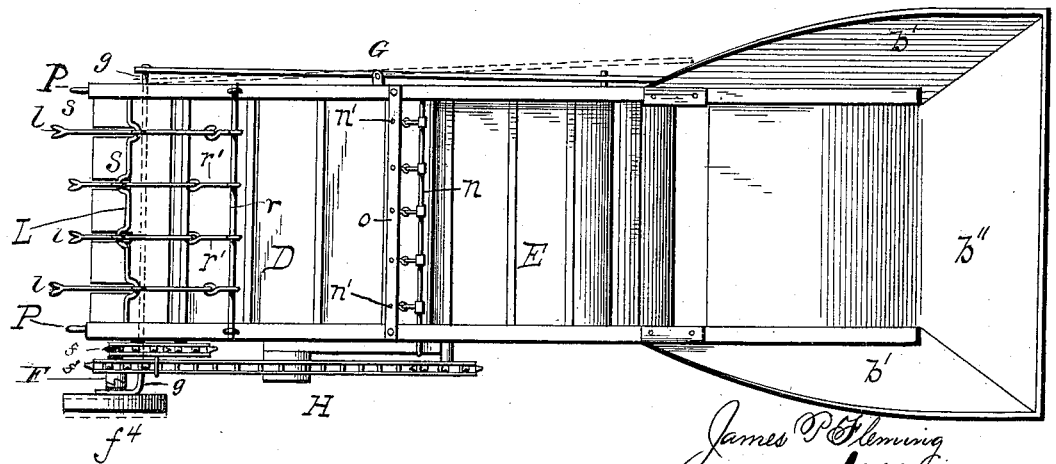
WITNESSES
INVENTORS
James P. Fleming
William D. Fleming
Attorney

UNITED STATES PATENT OFFICE.

JAMES P. FLEMING AND WILLIAM D. FLEMING, OF ARBOR HILL, IOWA.

BAND-CUTTER AND FEEDER FOR THRASHING-MACHINES.

SPECIFICATION forming part of Letters Patent No. 343,021, dated June 1, 1886.

Application filed January 14, 1886. Serial No. 188,567. (No model.)

*To all whom it may concern:*

Be it known that we, JAMES P. FLEMING and WILLIAM D. FLEMING, citizens of the United States of America, residing at Arbor Hill, in the county of Adair and State of Iowa, have invented certain new and useful Improvements in Band-Cutters and Feeders for Thrashing-Machines; and we do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

Our invention relates to certain new and useful improvements in combined band-cutters and feeders for thrashing-machines, the same consisting in the construction and combination of the parts, as will be hereinafter fully set forth, and specifically pointed out in the claims.

In the accompanying drawings, which illustrate our invention, Figure 1 is a side view of a band-cutter and feeder constructed in accordance with our invention. Fig. 2 is a longitudinal vertical sectional view, and Fig. 3 is a top view.

A refers to the side pieces or frame, which are provided at their front ends with an inclined guideway, B, which has an inclined bottom, $b$, and flaring sides $b'$, and end $b^2$. The bottom $b$ thereof terminates in front of a rotary belt, C, which is mounted on roller-shafts $c$ and $c'$. This belt C also passes above and below a central roller, $c''$. The side pieces, near their lower edges, are secured to each other by stay-rods $d$, two or more of which pass between the belt C. The upper edges of the side bars are also secured to each other by stay-rods $d'$, which are located between the endless belts D and E.

The guideway or trough B is suitably secured to the front ends of the side pieces, A, and, besides serving as a trough, assists in holding the side pieces to each other. A shaft, F, is journaled near the rear ends of the side pieces, and has rigidly attached thereto a cog-wheel, $f$, which meshes with a cog-wheel, $f''$, on the shaft of the roller $c$. The shaft F has secured thereto, adjacent to the cog-wheel $f$, a sprocket-wheel, $f'$, which is also provided with a half of a clutch, and upon the outer end of the shaft is located a sliding sleeve, which carries a drive-pulley, $f^4$, and the other half of the clutch, said half being recessed and embraced by a bar, $g$, which extends across the frame and is attached at the opposite side to a pivoted spring-bar, G, which engages with a suitable catch, said spring-bar extending near the trough D, as shown, so that the same may be within easy reach of the operator and can be manipulated to throw the machine in and out of gear.

The belt C is rotated when the machine is in operation, by the cog-wheels $f$ and $f''$, meshing with each other. Over the sprocket-wheel $f'$ passes a belt, H, which extends upwardly so as to pass over a sprocket-wheel, $h$, upon the shaft I, from whence said belt is led to the sprocket-wheel $i$ on the shaft J, said shaft rotating the belt E. The belt D is rotated by reason of the said belt being passed around the shaft I. The shaft I is also provided with a sprocket-wheel, $k$, over which the belt K passes, said belt also passing around a sprocket-wheel, $k'$, which is secured to the outer end of a crank shaft, L. When the machine is in operation, the belts and carriers will rotate in the direction indicated by the arrows on the drawings.

M refers to a transverse compartment, which is located between the belts D and E, said compartment being slotted at its bottom, as shown at $m$, through which slots pass the knives or cutting-blades $m'$. These knives are bent near their upper ends, and at their upper ends are pivotally secured to a transverse shaft, $n$, and at the elbow of the bend are each pivotally connected with upwardly-projecting rods, $n'$, which pass through perforations in the transverse bar $o$, between which bar and the upper portions of the knives are located spiral pressure-springs $o'$, each of the knives having thus independent spring movement, and may be forced or inclined rearwardly by pressure on their forward lower ends.

$r$ refers to a transverse rock-shaft, which is secured to the upper edges of the side pieces, said shaft carrying at suitable intervals pivoted bars $r'$, to which are hinged rods R, having central eyes, through which pass the cranks on the shaft L.

The ends of the side bars, A A, are each provided with hooks P, for attaching the same to the thrashing-machine, and the rods R are bifurcated at their ends, as shown at $l$, so that they can take a better hold of the grain and feed the same more effectively to the thrasher. Beneath the crank-shaft L are located slotted plates S, between the slots of which rods R move.

The operation of our invention is as follows: The sheaves of grain are delivered into the feeder by hand, and are carried forward by the belts C and E, and when said sheaves come in contact with the cutters $m'$ said cutters yield resistingly and sever the bands, after which the grain is carried to the end of the feeder, where it is loosened out and thrown into the thrashing-machine by the rods R. A belt-tightener, H', is applied to the belt H for taking up the slack of the same, as shown.

The feeder is adapted to be driven by a belt which drives the pulley $f^4$ from the thrashing-machine or driving mechanism thereof.

We claim—

1. The combination, with a series of resisting and yielding band-cutting knives, of a main conveyer-belt located beneath said knives, and a pair of belts, D E, located one in front and one in rear of the knives and above the main belt, substantially as set forth.

2. The combination, with a main delivery-belt and resisting and yielding band-cutters mounted above said belt, of a pair of belts, D E, located one in front and one in rear of the cutters, a drive-pulley, a clutch, and means for operating the same, a driving-chain, cog-wheels, and sprocket-wheels for operating the main belt and belts D E from the drive-pulley, substantially as described.

3. The combination, with a main feeding-belt, of a pair of belts, D E, mounted above the main belt, and a series of yielding band-cutters interposed between the belts D E of a rock-shaft, a series of rods mounted upon said rock-shaft, a drive-pulley, driving-chains, and sprocket and cog wheels, arranged substantially as set forth.

In testimony whereof we affix our signatures in presence of two witnesses.

JAMES P. FLEMING.
WILLIAM D. FLEMING.

Witnesses:
WILLIAM P. HUNTOON,
PRESTON L. SEVER.